May 31, 1966     D. W. PETERSON     3,254,168
DIMMER CONTROL IN TURN SIGNAL LEVER
Filed Dec. 30, 1963
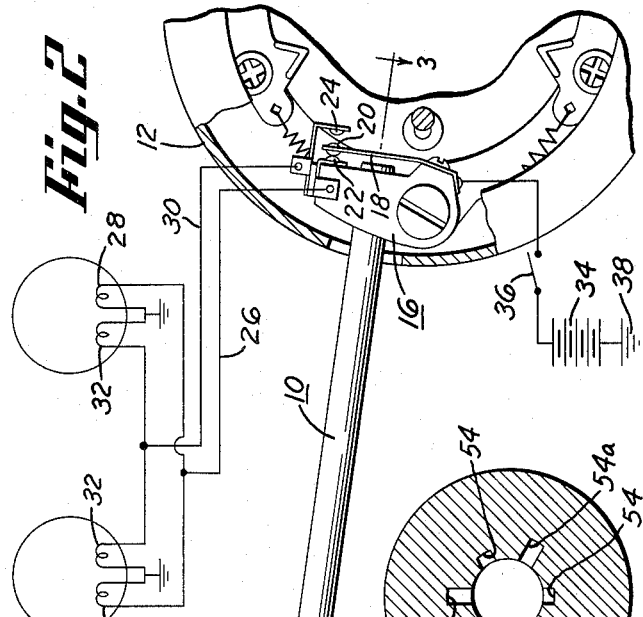
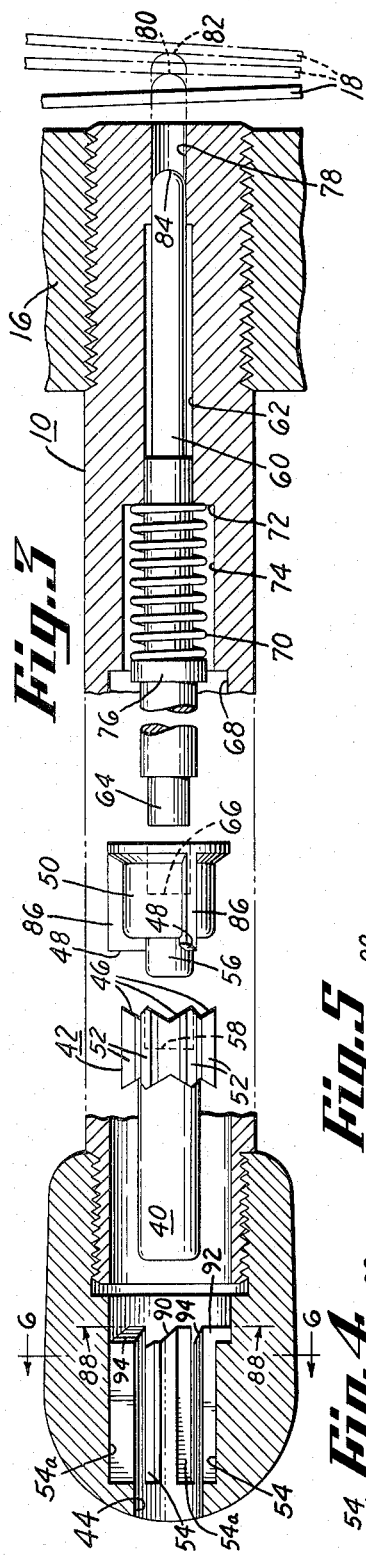
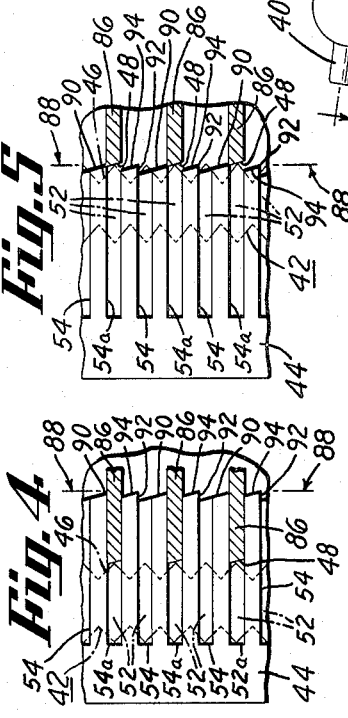
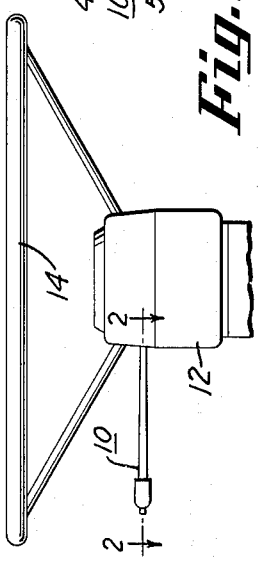
INVENTOR.
DONALD W. PETERSON
BY C. R. Meland
ATTORNEY United States Patent Office 3,254,168
Patented May 31, 1966

3,254,168
DIMMER CONTROL IN TURN SIGNAL LEVER
Donald W. Peterson, Fenton, Mich., assignor to General Motors Corporation, Detroit, Mich., a corporation of Delaware
Filed Dec. 30, 1963, Ser. No. 334,380
4 Claims. (Cl. 200—61.27)

This invention relates to automobile headlight dimmer switches and more particularly a type of headlight dimmer switch movable with and contained within an automobile directional control lever.

It is common in automobiles of present day design to have a floor mounted headlight dimmer switch in the driver's compartment. At times it becomes necessary to very quickly operate a dimmer switch in order to avoid blinding an oncoming car and the floor mounted dimmer switch must be activated quickly.

Therefore, it is an object of the present invention to provide an improved headlight dimmer switch actuating arrangement that is accessible to a motor vehicle operator's hands.

It is another object of the present invention to provide a headlight dimmer switch arrangement at least a part of which is mounted within the direction signal control lever.

It is still another object of the present invention to provide a headlight dimmer switch that is very inexpensive and simple to manufacture that can be used with directional system controls currently in use.

It is a further object of the present invention to provide a button operated dimmer switch which has the feature of apprising a driver of the position of the headlights in the event that the headlight beam indicator fails.

It is still a further object of the present invention to provide a switch actuating rod which rotates into a different position during actuation of the switch in order to allow for even wearing thereof.

Further objects and advantages of the present invention will be apparent from the following description, reference being had to the accompanying drawings wherein a preferred embodiment of the present invention is clearly shown.

In the drawings:

FIGURE 1 is an elevational view of an automobile turn signalling lever shown in its operative enviroment with the invention contained therein;

FIGURE 2 is a view taken along line 2—2 of FIGURE 1 including a typical automobile lighting circuit;

FIGURE 3 is a partly sectional and exploded view taken along line 3—3 of FIGURE 2;

FIGURE 4 is a view illustrating the cooperation of the switch cams, the cooperation of the cams of two opposed cylindrical surfaces shown in flat dispostion;

FIGURE 5 is a view of the cams of FIGURE 4 as shown in an actuated position;

FIGURE 6 is a sectional view taken along line 6—6 of FIGURE 3.

Referring now to FIGURE 1, a direction signal control lever 10 is mounted on a steering column 12 of an automobile, not shown, a steering wheel 14 being shown in its relative position.

Referring now to FIGURE 2, the lever 10 engages a conventional directional signal control mechanism, generally designated by the numeral 16, which is capable of controlling the direction signal apparatus on a motor vehicle. A switching member 18 carrying a double headed contact 20 is disposed between a fixed contact 22 and a fixed contact 24. The fixed contact 22 is in conductive relationship through a lead 26 to a plurality of filaments 28 providing a low beam for automotive headlights. The fixed contact 24 is in conductive relationship through leads 30 to a plurality of filaments 32 which provide a high beam for automotive headlights. It is understod that the filaments 28 and 32, respectively, can be contained within a single headlight or contained in separate headlights. The switch member 18 is of spring metal construction and is normally biased toward the fixed contact 22 to provide a vehicle's headlights with a low beam capability. The switching member 18 is driven toward the fixed contact 24 in a manner to be hereinafter described to provide a vehicle's headlights with a high beam capability.

Electrical current is caused to flow from a battery 34 through a headlight switch 36 to either of the contacts 22 and 24 to the filaments 28 or 32 and thence to ground, designated by the numeral 38.

Referring now to FIGURE 3, an actuator button 40 carrying a cam 42 is disposed to slide in a bore 44 through one end of the turn signal control lever 10. The button 40 is illustrated in FIGURE 3 out of position to more clearly illustrate its design. The cam 42 has a series of camminng surfaces 46 disposed to cooperate with a series of surfaces 48 on a cam follower 50. The cam 42 has laterally extending ribs 52 disposed to slidably engage a series of cooperating grooves 54 and 54a formed in the outside periphery of the bore 44.

FIGURE 6 illustrates a radial disposition of the grooves 54 and 54a in the bore 44.

The cam follower 50 has a cylindrical end 56 adapted to be freely rotatable in a pocket 58 disposed in one end of the button 40. An actuator rod 60 is slidably disposed in a bore 62 of the lever 10 and has an end 64 disposed in a pocket 66 in the cam follower 50. The cam follower 50, in its operative engagement with the end 64 of the rod 60, is radially located in a bore 68 in the lever 10. A return spring 70 coperates with a flange 72 in a bore 74 in the lever 10 and a peripheral flange 76 of the rod 60 to bias the rod 60 leftwardly as viewed in FIGURE 3. One end of the rod 60 slides in a bore 78 of the lever 10 and, in response to button pressure, moves to point 80 and to point 82 while in contact with the switching member 18 in a manner to be hereinafter described.

In operation, the button 40 is pushed towards the right, as viewed in FIGURE 2, in order to drive the switching member 18 carrying the double headed contact 20 into engagement with either of the fixed contacts 22 or 24. The various operative positions of the switching member 18 are illustrated in the phantom views in FIGURE 3. Referring to FIGURE 3, pressure on the button 40 will cause the rod 60 to move to point 82. This is an overtravel position and release of pressure on the button, after the rod 60 is moved to point 82, will result in a final positioning of the rod at either point 80 or point 84 depending on which portion of the bore 44 engages the cam follower 50.

In order to more clearly illustrate the cooperation of the cam follower 50, the ribs 52 and the grooves 54 and 54a, the substantially cylindrical bore 44 is shown on a single plane in FIGURES 4 and 5.

Referring now to FIGURE 4, the ribs 52 of the cam 42 are slidably disposed in the grooves 54 and 54a of the bore 44. The end 64 of the rod 60, by virtue of the force from the spring 70, constantly biases the cam follower 50 toward the bore 44. The cam follower 50 has a plurality of surfaces 48 formed on the leading edge of a series of ribs 86 which are adapted to slide in the grooves 54a. It should be noted that the outer periphery of the ribs 86 is slightly greater in diameter than the outer periphery of the ribs 52. Every one of the grooves 54a is of great enough depth to accept the ribs 86 of the cam follower 50. Therefore, in only certain positions of rotary movement will the cam follower 50 be allowed to move into the position illustrated in FIGURE 4. When the ribs 86 are in the position as illustrated in FIGURE 4, the rod 60 will be in a position illustrated by the solid lines in FIGURE 3. At the same time, the switching member 18 will be in the position illustrated by the solid lines in FIGURE 3. This position of the switching member 18 is the position illustrated in FIGURE 2 in which the filaments 28 are energized providing a low beam capability for the headlights.

Referring now to FIGURE 5, if it is desired to activate the filaments 32 of the headlights to provide a high beam capability, pressure is exerted on the button 40. Movement of the button 40 in a rightward direction, as viewed in FIGURE 3, will result in the ribs 52 moving rightwardly in the grooves 54 and 54a as viewed in FIGURE 5. Several of the surfaces 46 will engage the surfaces 48 of the ribs 86 and will cause the ribs 86 to be driven into the position illustrated in FIGURE 5. It will be noted that the outer edges of the surfaces 46 will engage the surfaces 48 of the ribs 86 approximately in the center. Therefore, it is apparent that each inclined surface 48 is in contact with a cooperating inclined surface 46 of the cam 42. This cooperation of inclined surfaces will give the cam follower 50 a tendency to rotate along the inclined surface 46. As viewed in FIGURE 5, this tendency to rotate would be illustrated by an upward movement as viewed therein. Due to the cooperation of the ribs 86 with the deepened grooves 54a, the cam follower 50 will not rotate until the ribs 86 are pushed beyond the end of the grooves 54a. As previously mentioned, the grooves 54a are deepened and adapted to accept the larger periphery of the ribs 86. In the example illustrated in FIGURE 5, every groove 54a is deepened sufficiently to accept the ribs 86. Therefore, as the ribs 86 are pushed out of the deepened groove, they have a tendency to move upwardly, as viewed in FIGURE 5, into a plane 88 formed as an annular ridge on the periphery of the bore 44. The plane 88 between the grooves 54 and 54a is comprised of an inclined ramp 90 and a stop 92.

Therefore, as the ribs 86 are pushed from the deepened grooves 54a, they have a tendency to move up, as veiwed in FIGURE 5, and, when clear of the plane 88, the surfaces 48 will slide onto the ramp 90 and move along the ramp 90 until they engage the stops 92. It is seen that the ribs 86 are thereby prevented from reengaging the adjacent series of deepened grooves 54a and will be held in an extended position against the stops 92. Due to the direct engagement of the cam follower 50 with the rod 60, the rod will come to rest at point 80 as seen in FIGURE 3. Point 80 illustrates the position that the switching member 18 assumes when the movable contact 20 engages the fixed contact 24. The fixed contact 24, being in conductive relationship to the filaments 32, the high beam capability of the automobile headlights is realized.

The travel of the rod 60 in the bore 78 to the point 82 is brought about by the initial movement of the rib 86 over the high point of the ramp 90 and its subsequent position at point 80 is brought about by the movement of the surface 48 down the ramp 90.

Referring to FIGURE 2, if it is desired to move the switching member 18 away from the fixed contact 24 and back into engagement with the fixed contact 22, pressure is again put on the button 40.

Referring to FIGURE 5, pressure on the button 40 will move the surfaces 46 of the cam 42 into engagement with the surfaces 48 of the cam follower ribs 86 and will cause the cam follower 50 to move rightwardly as viewed in FIGURE 5. Again, the high point of the surfaces 46 engage the surfaces 48 of the ribs 86 approximately in the center giving the cam follower 50 a tendency to rotate along the surfaces 48. As the ribs 86 are pushed beyond the stops 92, the rotation takes place and then the surfaces 48 will slide down a series of ramps 94. The ramps 94 are immediately adjacent to the deepened grooves 54a and, consequently, the ribs 86 will slide into the deepened grooves 54a and assume a position as shown in FIGURE 4. The biased rod 60 will follow the cam follower into the deepened grooves 54a and will move to point 84, thereby relieving pressure from the biased switching member 18.

The switching member 18 will therefore move leftwardly, as viewed in FIGURE 2, and the double headed contact 20 will break the circuit established through the fixed contact 24 and will reestablish the circuit through the fixed contact 22. In this manner, the headlights have been changed from a high to a low beam.

The utility of the present invention is clearly demonstrated in an application where the button switch located on the direction control lever 10 controls the beam of automobile headlights either alone or in conjunction with a floor mounted switch.

It should be noted that the circuitry illustrated in FIGURE 2 describes the use of the subject device with a single headlight having a double filament. It is understood that this invention would work equally as well with a headlight system wherein the filaments are contained in different headlights.

While the embodiment of the present invention, as herein disclosed, constitutes a preferred form, it is to be understood that other forms might be adopted.

What is claimed is as follows:

1. The combination of a directional signal controller and a dimmer switch, said combination comprising: a common housing; said housing being carried by a relatively fixed portion of a vehicle and being movable in a first plane between extreme radial positions relative to its mounting to generate a turn signal indication, said housing having a hollow interior with circumferentially spaced axially positioned grooves and raised portions alternately positioned on the hollow interior to define hills and valleys; cam driver means slidable in said grooves; cam follower means engaging said cam driver means and responsive to movement of said cam driver to assume positions in said hills and valleys corresponding to a desired switch energization position; acutator means following the movement of said cam follower means and extending from said hollow interior to provide a force along the longitudinal axis thereof; and reciprocable contact means carried at a point across the longitudinal axis of said housing in interfering relationship with said actuator means for alternately energizing circuits in response to movement of said actuator means to selectively switch vehicle headlamps to high and low positions.

2. The combination according to claim 1 wherein said cam driver means has a button portion extending through an end of said housing, said button portion assuming an axial position along the longitudinal axis of said housing corresponding to the axial position of said actuator means thereby providing a feel sensitive locating position for said dimmer switch.

3. The combination according to claim 1 wherein said cam driver means has perpherally disposed ridges spaced apart a distance equal to said hills and valleys, said ridges having first cam portions formed on an end thereof, and said cam follower means having second cam portions normally engaging said first cam portion and engageable with said cam portion of said cam driver during axial movement thereof to rotate said cam follower means to a new rotary position relative to said housing and holding said cam follower means positioned in either of two axial positions.

4. The combination according to claim 3 wherein said peripherally disposed ridges terminate in first cam portions spaced at two points along the interior surface of said housing to define two axial locating points for said cam follower means and said actuator means, said cam driver having cam portions slidable in said grooves and engageable with said second cam portions on an inclined portion thereof tending to create rotational movement in said cam follower means, said cam follower means rotating onto adjacent first cam portions to continue rotation to a new rotary position wherein the axial position of said cam follower means and actuator means is positioned at a different axial position from that previously positioned, said two axial positions corresponding to a high or low switching position of said headlamp dimmer switch.

References Cited by the Examiner

UNITED STATES PATENTS

| | | | |
|---|---|---|---|
| 1,572,828 | 2/1926 | Walter | 200—61.54 |
| 2,453,035 | 11/1948 | Ponsy | 200—4 |
| 2,557,887 | 1/1951 | Nolan | 200—61.54 |
| 2,796,483 | 6/1957 | Wolf | 200—61.54 |
| 2,890,387 | 6/1959 | Wiley et al. | 200—153 X |
| 2,945,111 | 7/1960 | McCormick | 200—160 |

FOREIGN PATENTS 779,956  1/1934  France.

BERNARD A. GILHEANY, *Primary Examiner.*

HERBERT A. LEWITTER, *Assistant Examiner.*